United States Patent
Krauss

(10) Patent No.: US 6,722,527 B1
(45) Date of Patent: Apr. 20, 2004

(54) IRRIGATION FLUID DISPENSER

(75) Inventor: Larry Krauss, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 138 days.

(21) Appl. No.: 09/970,508

(22) Filed: Oct. 3, 2001

(51) Int. Cl.⁷ .............................................. B05B 7/26
(52) U.S. Cl. ...................... 222/1; 222/129; 222/630; 239/310; 239/318; 137/268
(58) Field of Search ................. 239/310, 317, 239/318; 137/268; 222/1, 129, 133, 630, 481.5

(56) References Cited

U.S. PATENT DOCUMENTS

| | | | | |
|---|---|---|---|---|
| 1,497,271 A | * | 6/1924 | Harrison | 239/310 |
| 3,195,985 A | * | 7/1965 | Elkin | 239/310 |
| 5,364,030 A | * | 11/1994 | Murdock et al. | 239/310 |
| 5,823,430 A | * | 10/1998 | Clark et al. | 239/10 |

* cited by examiner

*Primary Examiner*—Kenneth Bomberg
(74) *Attorney, Agent, or Firm*—Townsend and Townsend and Crew LLP

(57) ABSTRACT

Embodiments of the present invention are directed to a fluid dispenser for dispensing landscape maintenance fluids or the like which contain products such as fertilizers, herbicides, and pesticides. The fluid dispenser injects the fluids directly into the mainstream of an irrigation system. The dispensing system operates by shunting a portion of the main irrigation water stream through a bypass to the dispenser containing the product to be dispensed. The water dilutes the product to be applied, and is injected back into the main irrigation stream by the back pressure of the irrigation system. When the irrigation is completed, the fluid flow in the main irrigation stream is reduced or terminated and the pressure drops. After the pressure drops, the fluid ceases to be diverted to the container, and the main irrigation stream drains. The vent opens, and the atmospheric pressure and the configuration of the filled outlet channel cause a siphon action to continue drawing fluid from the container into the main irrigation stream. This siphoning of the fluid from the container continues until the container is empty.

23 Claims, 8 Drawing Sheets

 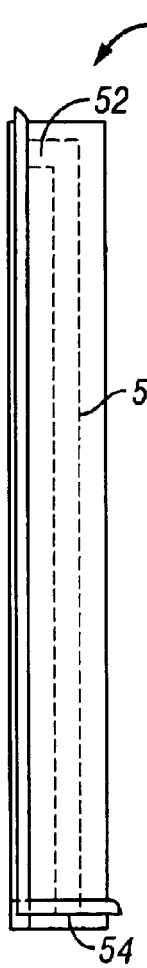 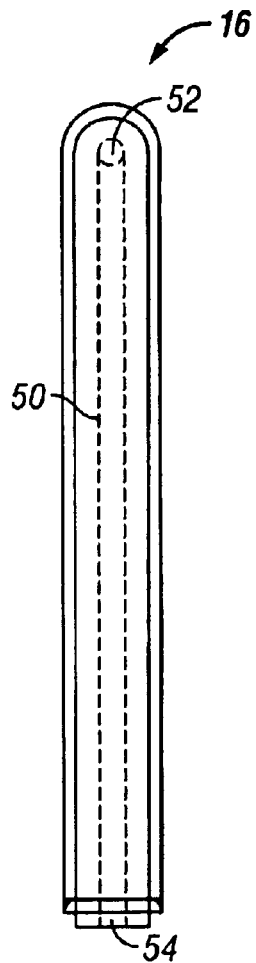
FIG. 12   FIG. 11   FIG. 13
 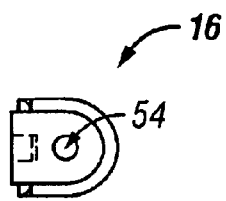
FIG. 14   FIG. 15

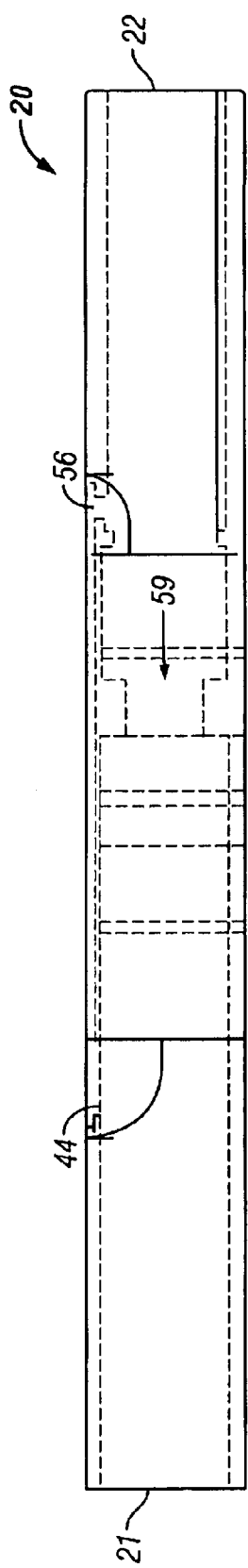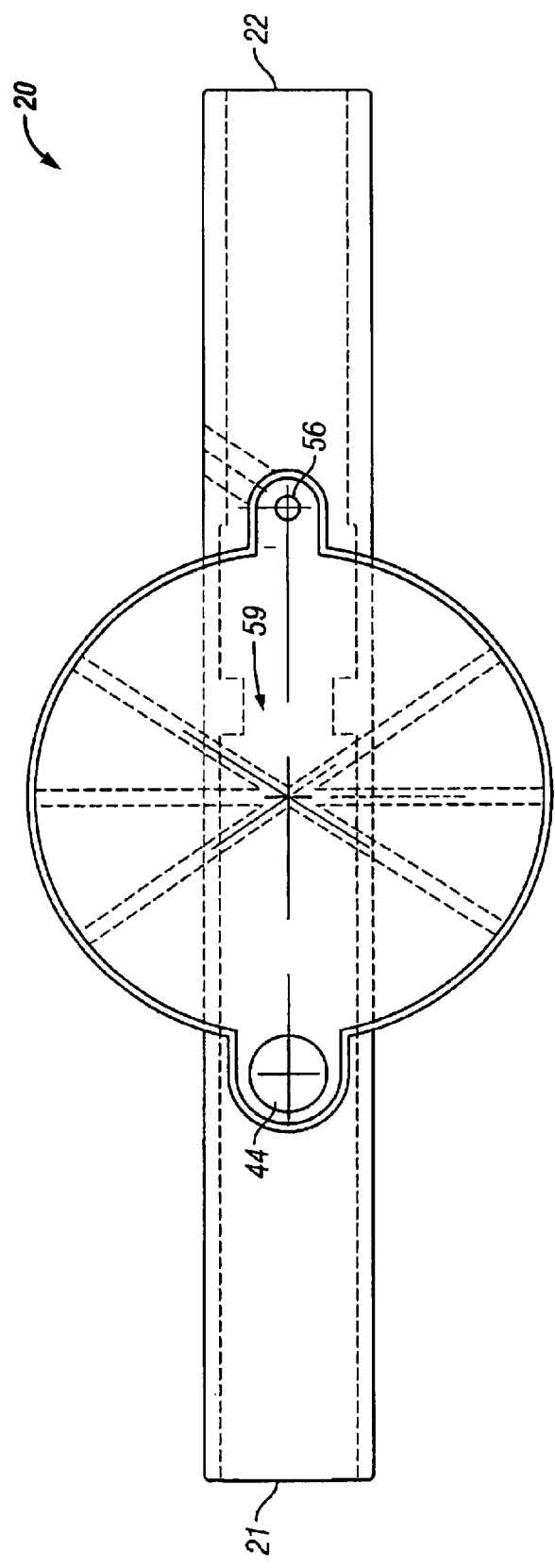

IRRIGATION FLUID DISPENSER

BACKGROUND OF THE INVENTION

The present invention relates generally to fluid dispensing apparatus and, more particularly, to an irrigation fluid dispenser for dispensing landscape maintenance fluids and the like.

There exist different ways of dispensing landscape maintenance products, such as fertilizers, herbicides, and pesticides. In some cases, the uneven distribution may result in hot spots in certain areas. Some systems require the use of external power such as electrical power to dispense landscape maintenance fluids containing such products.

BRIEF SUMMARY OF THE INVENTION

Embodiments of the present invention are directed to a fluid dispenser for dispensing landscape maintenance fluids or the like which contain products such as fertilizers, herbicides, and pesticides. The fluid dispenser injects the fluids directly into the mainstream of an irrigation system. The dispensing system operates by shunting a portion of the main irrigation water stream through a bypass to the dispenser containing the product to be dispensed. The water dilutes the product to be applied, and is injected back into the main irrigation stream by the back pressure of the irrigation system and the venturi action caused by the restriction in the main irrigation stream adjacent to the orifice from the dispenser outlet back into the main irrigation channel.

In accordance with an aspect of the present invention, a fluid dispensing apparatus comprises a primary flow member having a primary flow line disposed between an inlet port and an outlet port. The primary flow line is configured to be placed in fluid communication with an irrigation fluid flow stream. The primary flow member includes a first orifice disposed near the inlet port and a second orifice disposed near the outlet port. The first and second orifices are in fluid communication with the primary flow line. A container has a container fluid inlet and a container fluid outlet. The container fluid inlet is disposed near a top of the container and is fluidicly coupled with the first orifice of the primary flow member. The container fluid outlet is disposed near a bottom of the container and is fluidicly coupled with the second orifice of the primary flow member via an outlet channel which extends from the container fluid outlet up toward the top of the container and back down toward the second orifice of the primary flow member.

In some embodiments, the container includes a removable container cap. The removable container cap is threadingly coupled to the top of the container. A seal is placed between the removable container cap and the top of the container. The seal may comprise an O-ring. A flow restriction is disposed in the primary flow member, and is adjacent to and upstream of the second orifice of the primary flow member.

In accordance with another aspect of the invention, a fluid dispensing apparatus comprises a primary flow member having a primary flow line disposed between an inlet port and an outlet port. The primary flow line is configured to be placed in fluid communication with an irrigation fluid flow stream. The primary flow member includes a first orifice disposed near the inlet port and a second orifice disposed near the outlet port. The first and second orifices are in fluid communication with the primary flow line. A container has a container fluid inlet and a container fluid outlet. The container fluid inlet is fluidicly coupled with the first orifice of the primary flow member. The container fluid outlet is fluidicly coupled with the second orifice of the primary flow member. The container includes a check valve disposed at a top above the container fluid inlet and the container fluid outlet. The check valve is closed to block air flow through a vent in the container during filling of the container by the irrigation fluid from the irrigation fluid flow stream via the primary flow line, the first orifice, and the container fluid inlet. The check valve is open to permit air flow through the vent into the container during draining of the fluid from the container into the irrigation fluid flow stream via the container fluid outlet, the second orifice, and the primary flow line.

In accordance with another aspect of the present invention, a method of dispensing fluid from a container comprises flowing a fluid through a primary fluid flow tube to form a primary fluid flow stream. A portion of the fluid is diverted from the primary fluid flow stream through a first orifice of the primary fluid flow tube into the container via a container fluid inlet of the container to fill the container with the fluid and dilute a product in the container with the fluid. The fluid from the container is returned through a container fluid outlet of the container to the primary fluid flow stream via a second orifice of the primary fluid flow tube. The method further comprises stopping diverting the fluid into the container, and siphoning the fluid in the container through the container fluid outlet of the container into the primary fluid flow tube via the second orifice.

In some embodiments, siphoning the fluid in the container comprises permitting air flow into the container when stopping diverting the fluid into the container. The air flow into the container is controlled by a check valve disposed above the container fluid inlet and the container fluid outlet. The check valve is closed to block air flow through a vent in the container during filling of the container by the fluid from the primary fluid flow stream. The check valve is open to permit air flow through the vent into the container and siphon the fluid in the container through the container fluid outlet of the container into the primary fluid flow tube via the second orifice when stopping diverting the fluid into the container.

In specific embodiments, stopping diverting the fluid into the container comprises reducing or terminating the fluid flow through the primary fluid flow tube. The method further comprises placing inside the container the product to be diluted by the fluid. The product may be introduced into the container manually or automatically.

BRIEF DESCRIPTION OF THE DRAWINGS

FIG. 11 is a front elevational view of the outlet channel portion of the fluid dispenser of FIG. 1;

FIG. 12 is a left side elevational view of the outlet channel portion of FIG. 11;

FIG. 13 is a right side elevational view of the outlet channel portion of FIG. 11;

FIG. 14 is a top plan view of the outlet channel portion of FIG. 11;

FIG. 15 is a bottom plan view of the outlet channel portion of FIG. 11;

FIG. 16 is a front elevational view of the primary flow member of the fluid dispenser of FIG. 1; and FIG. 17 is a top plan view of the primary flow member of FIG. 16.

DETAILED DESCRIPTION OF THE INVENTION

The present invention is directed to a fluid dispenser. In specific embodiments, the fluid dispenser is used to inject landscape maintenance fluids, such as fertilizers, herbicides, and pesticides, directly into the mainstream of an irrigation system. The dispenser is installed between the antisiphon valve and the irrigation heads. One dispenser may be installed as a dedicated unit for each irrigation system. The dispensing system operates by shunting a portion of the main irrigation water stream through a bypass to the dispenser containing the product to be dispensed. The water dilutes the product to be applied, and is injected back into the main irrigation stream by the back pressure of the irrigation system and the venturi action caused by the restriction in the main irrigation stream adjacent to the orifice from the dispenser outlet back into the main irrigation channel.

Figure 1:
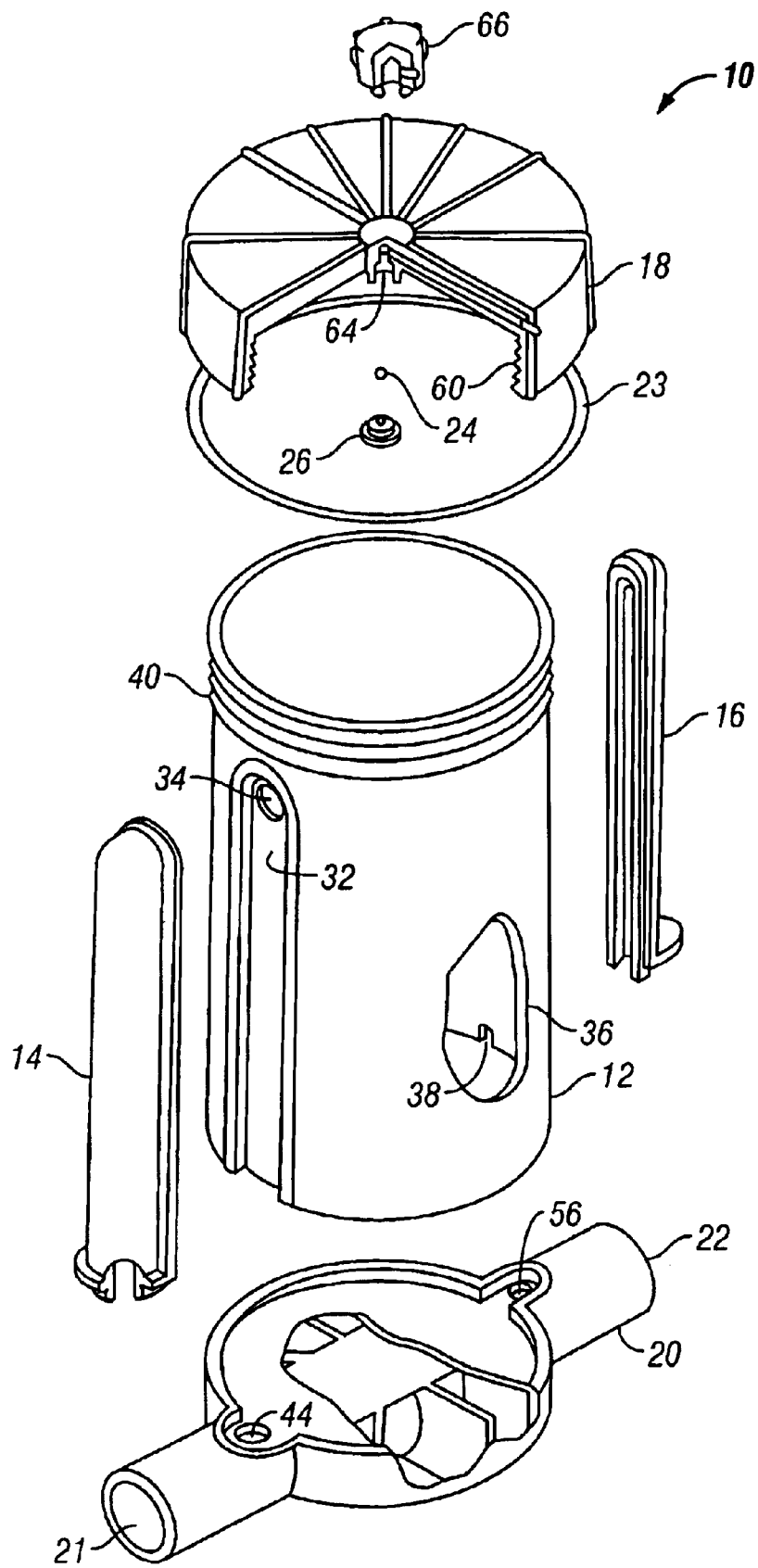
FIG. 1 is an exploded perspective view of the fluid dispenser according to an embodiment of the present invention.
Figure 2:
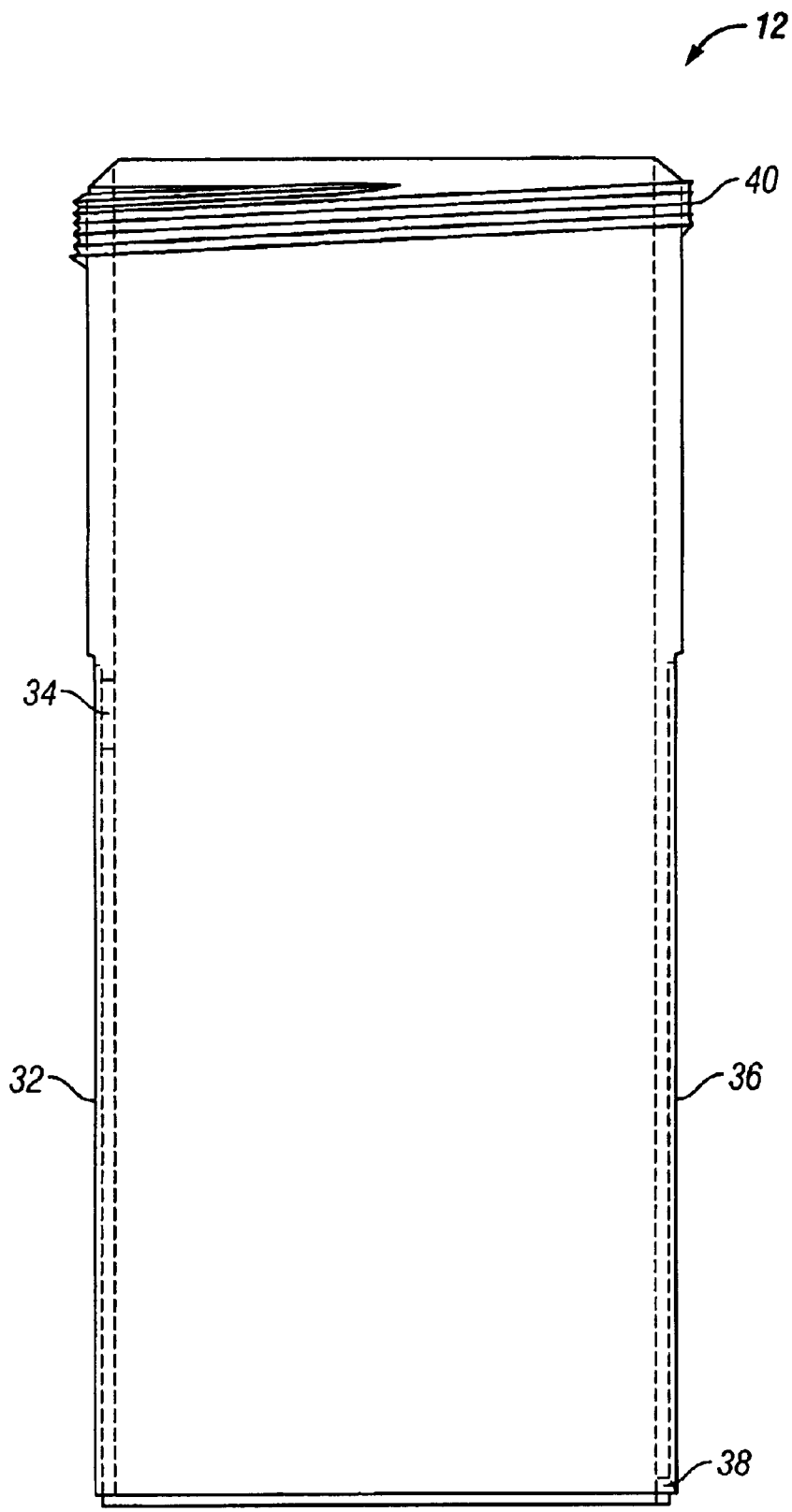
FIG. 2 is a front elevational view of the container of the fluid dispenser of FIG. 1.
Figure 3:
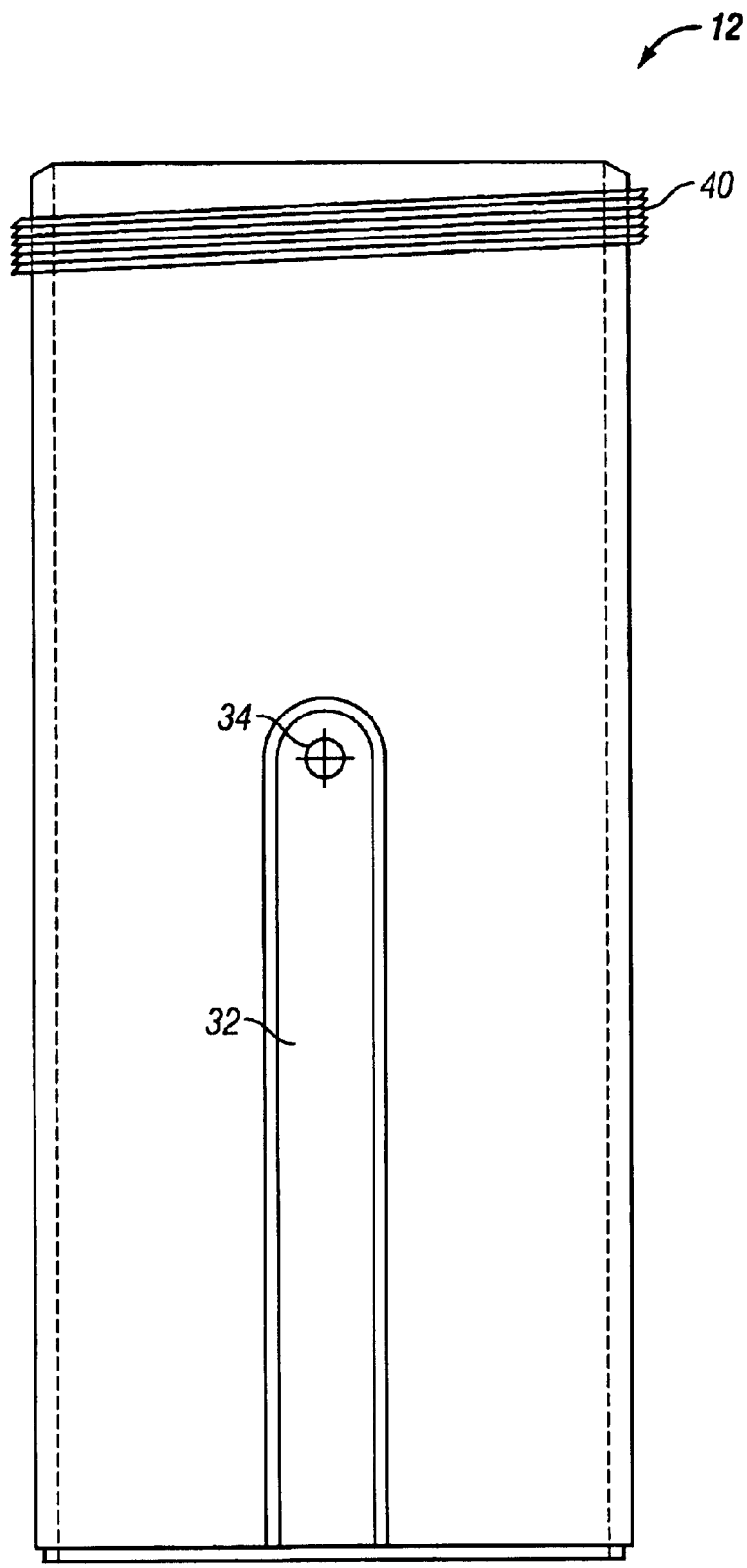
FIG. 3 is a left side elevational view of the container of FIG. 2.
Figure 4:
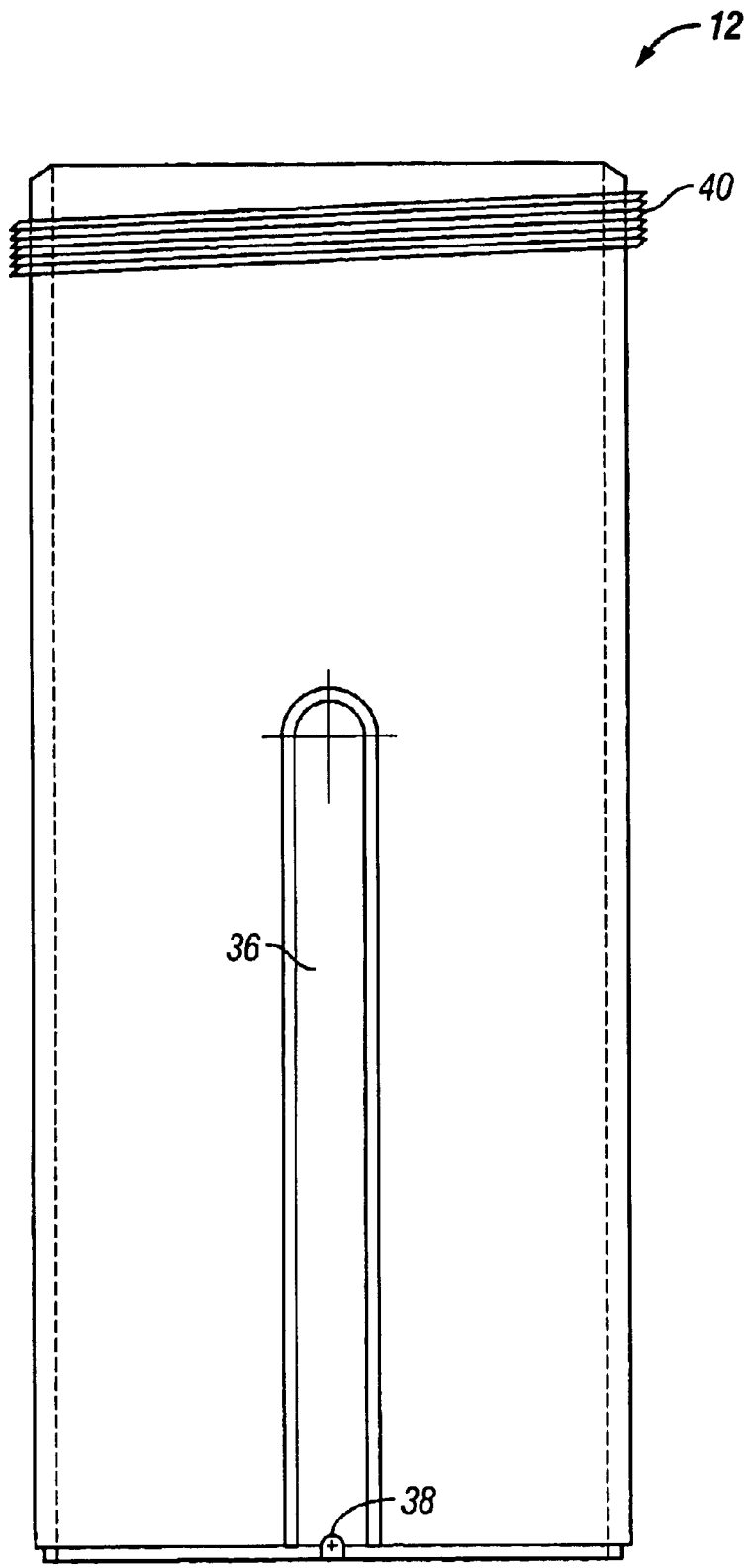
FIG. 4 is a right side elevational view of the container of FIG. 2.
Figure 5:
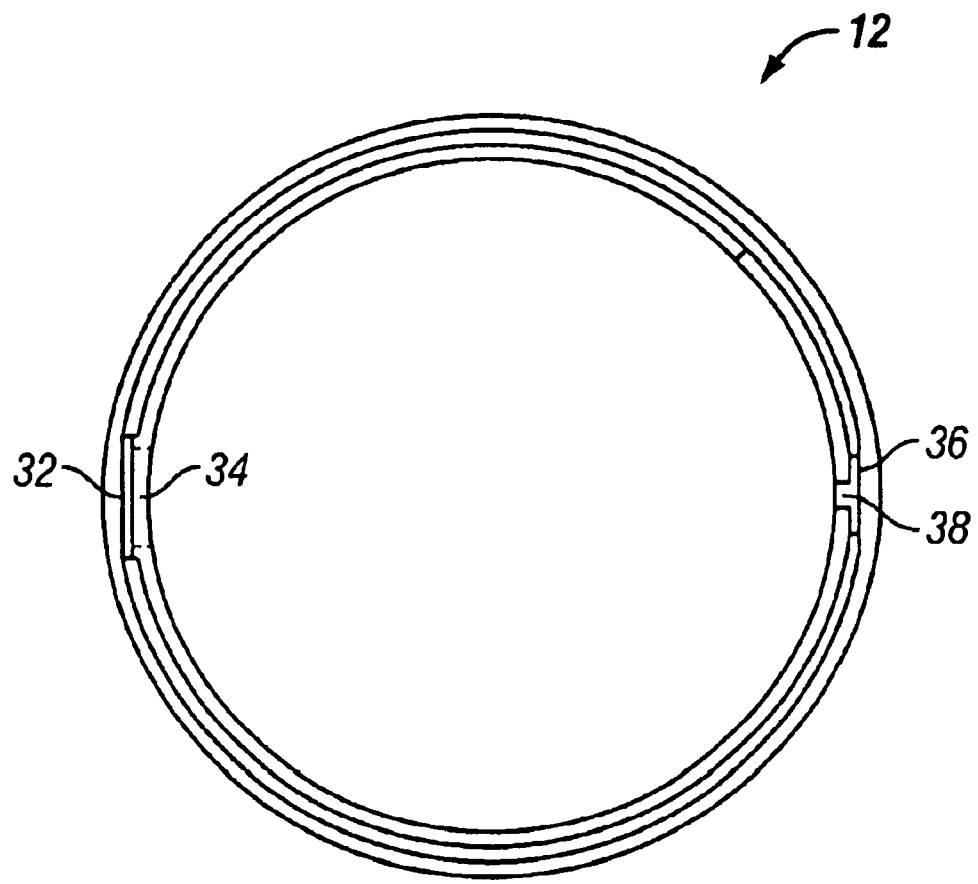
FIG. 5 is a bottom plan view of the container of FIG. 2.
Figure 7:
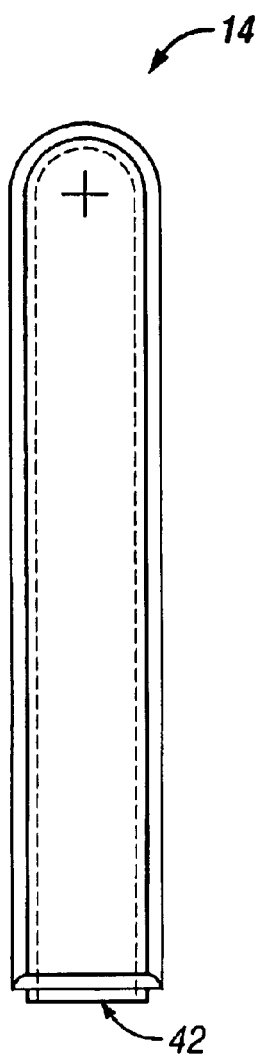
FIG. 7 is a left side elevational view of the inlet channel portion of FIG. 6.
Figure 6:
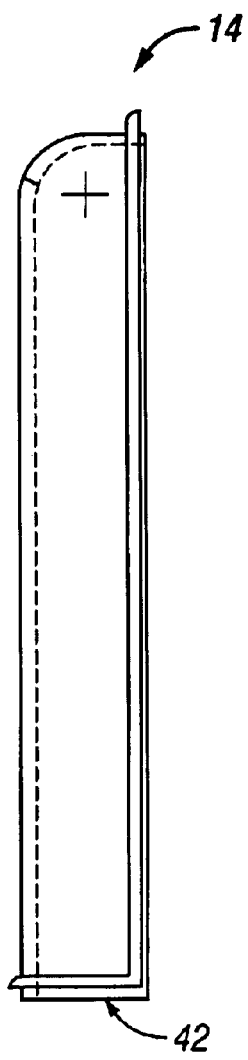
FIG. 6 is a front elevational view of the inlet channel portion of the fluid dispenser of FIG. 1.
Figure 8:
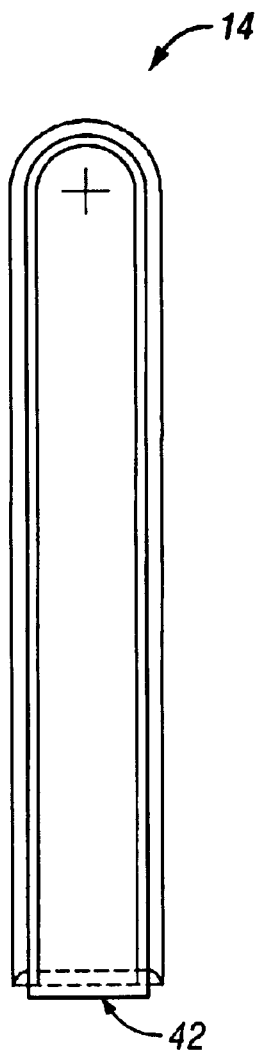
FIG. 8 is a right side elevational view of the inlet channel portion of FIG. 6.
Figure 9:
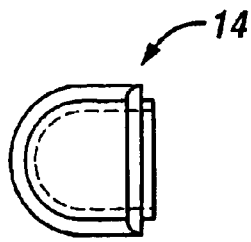
FIG. 9 is a top plan view of the inlet channel portion of FIG. 6.
Figure 10:
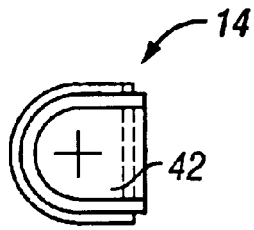
FIG. 10 is a bottom plan view of the inlet channel portion of FIG. 6.

FIG. 1 shows a fluid dispenser 10 having a container 12, an inlet channel portion 14 coupled to an inlet side of the container 12, an outlet channel portion 16 coupled to an outlet side of the container 12, a container cap 18 coupled to the top of the container 12, and a primary flow member 20 coupled to the bottom of the container 12. The primary flow member 20 includes a main irrigation stream flowing from an inlet port 21 to an outlet port 22. An O-ring 23 is disposed at the connection between the container 12 and the container cap 18 to provide a seal therebetween. A check ball 24 and a check ball retainer 26 are disposed at the top of the container 12 and coupled with the container cap 18 to form a check valve, as discussed in more detail below.

As shown in FIGS. 1–5, the container 12 includes an inlet portion 32 with an inlet orifice 34 disposed near the top of the container 12. The inlet channel portion 14 is connected to the inlet portion 32 to form an inlet flow channel. The container 12 includes an outlet portion 36 with an outlet orifice 38 disposed near the bottom of the container 12. The outlet channel portion 16 is connected to the outlet portion 36 to form an outlet flow channel. The container 12 has a filling capacity as defined by the locations of the inlet and outlet orifices and channels. For example, a typical container 12 may have a filling capacity of about 16 oz of liquid. The container 12 further includes a threaded top 40.

The inlet channel formed by coupling the inlet channel portion 14 to the inlet portion 32 of the container 12 provides a path for the pressurized irrigation water to enter the container 12 and dilute the product in the container 12 to be dispensed. As best seen in FIGS. 1 and 6–10, the inlet channel portion 14 is a shell structure that includes an open bottom 42 coupled with an orifice 44 of the primary flow member 20 for receiving the irrigation water.

The outlet channel formed by coupling the outlet channel portion 16 to the outlet portion 36 of the container 12 provides a path for the diluted fluid to be dispensed into the main irrigation stream between the inlet port 21 and the outlet port 22 in the primary flow member 20. As best seen in FIGS. 1 and 11–15, the outlet channel portion 16 includes an internal flow path 50 having an upper end 52 connected to the outlet channel formed by coupling the outlet channel portion 16 to the outlet portion 36, and a lower end 54 mated with an orifice 56 of the primary flow member 20. The pressurized fluid from the container 12 is forced through the outlet orifice 38 into the outlet channel until it reaches the top of the outlet channel portion 16, and then via the upper end 52 through the internal flow path 50 down through the orifice 56 back into the main irrigation stream in the primary flow member 20. When the irrigation is completed, the fluid flow in the main irrigation stream is reduced or terminated and the pressure drops. After the pressure drops, the fluid ceases to be diverted to the container, and the main irrigation stream drains. The vent opens, and the atmospheric pressure and the configuration of the filled outlet channel cause a siphon action to continue drawing fluid from the container 12 into the stream via the orifice 56. This siphoning of the fluid from the container 12 continues until the container 12 is empty.

Both the inlet flow path (via the inlet orifice 34) and the outlet flow path (via the top end 52 of the internal flow path 50) for the container 12 employ an up-and-over design that permits filling the container 12 without spillover into the irrigation system, and evacuation of the fluid from the container by siphoning after each use. The container 12, inlet channel portion 14, and outlet channel portion 16 may be made of PVC, ABS plastic, or the like. The inlet channel portion 14 and outlet channel portion 16 can be connected to the inlet portion 32 and the outlet portion 36, respectively, of the container 12 by any suitable methods, such as gluing, bonding, and the like.

The primary flow member 20 is bonded to the container assembly comprised of the container 12, inlet channel portion 14, and outlet channel portion 16. Additional views of the primary flow member 20 are shown in FIGS. 16 and 17. The venturi action flow restriction 59 in the main irrigation stream as described above is shown in FIGS. 16 and 17, which is adjacent to and upstream of the orifice 56 of the primary flow member 20. The primary flow member 20 may be made of PVC, ABS plastic, or the like. The main water pipe may be installed into the irrigation system, for example, by gluing with PVC slip fittings or by a slip fit repair union.

The container cap 18 includes internal threads 60 for mating with the threaded top 40 of the container 12, as shown in FIG. 1. The cap 18 is sealed to the container 12 with the O-ring 23 or other sealing member. The cap includes a valve seat 64. A check valve is formed by the valve seat 64, the check ball 24 and the check ball retainer 26. The check ball 24 may be made of nylon. When the container 12 is pressurized from the fluid flow therethrough, the check ball 24 is pushed up against the valve seat 64 of the cap to block air flow through a vent cap 66 disposed above the valve seat 64. The vent cap 66 in this embodiment is a press-in, removable, cap. Of course, other ways of providing a vent may be used. The check ball retainer 26 has a center hole that allows pressure to seat the check ball 24. When the pressure is removed at the end of an irrigation cycle, the check ball drops from the valve seat 64 to the check ball retainer 26 which is bonded to the container cap 18, allowing air to enter the container 12 through the vent cap 66 while the remaining fluid is siphoned from the container 12 to the main irrigation channel of the primary flow member 20. Conveniently, the vent cap 66 contains a through hole which allows cleaning with a pipe cleaner.

In operation, the dispenser 10 is filled by removing the container cap 18 and adding the desired amount of product such as fertilizer or herbicide to be dispensed. The amount may be determined by calculating the product weight per lawn area to be applied. During irrigation, water from the main irrigation stream flows through the primary flow member 20 as shown in FIG. 1. The dispenser 10 shunts a portion of the water from the main irrigation stream via the orifice 44 and through a bypass inlet channel formed by the inlet channel portion 14 to the container 12. This diverted water fills the container 12 and dilutes the product in the container 12 to be applied. The back pressure of the irrigation system pressurizes the container 12, and forces the diluted product to be injected into the irrigation system through the outlet channel formed by the outlet channel portion 16 and the orifice 56.

In the present dispensing system, the bypass to the dispenser container 12 does not impose any restrictions to the system water flow. By diluting the product before dispensing, there are no chemical surges or hot spots in any one area. The dispenser 10 requires no outside power to operate. The dispenser 10 is self-cleaning in that product dilution is sustained to about 100% (or pure water) when the product application is complete. When product application is complete, the dispenser 10 is evacuated automatically by siphoning the remaining fluid through the outlet channel via the orifice 56. The configuration of the outlet channel causes the siphon action as soon as the system back pressure is removed.

In specific embodiments, the dispenser 10 is installed in the irrigation system between the antisiphon valve and the irrigation heads. The dispenser 10 may be installed in new systems using slip connectors, or in existing systems using slip/slip repair couplings. The dispenser 10 may be installed above ground or partially buried. The size of the dispenser 10 may vary depending on the application, ranging from a small unit for home use or a commercial size for use in larger areas such as golf courses, parks, farms, and the like.

The filling of the container 12 with products to be dispensed may be performed manually, or may be done automatically from selectable external sources in a fully automatic version, at times coordinated with a normal automatic irrigation system.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A fluid dispensing apparatus, comprising:
    a primary flow member having a primary flow line disposed between an inlet port and an outlet port, the primary flow line configured to be placed in fluid communication with an irrigation fluid flow stream, the primary flow member including a first orifice disposed near the inlet port and a second orifice disposed near the outlet port, the first and second orifices in fluid communication with the primary flow line; and
    a container having a container fluid inlet and a container fluid outlet, the container fluid inlet being disposed near a top of the container and being fluidicly coupled with the first orifice of the primary flow member, the container fluid outlet being disposed near a bottom of the container and being fluidicly coupled with the second orifice of the primary flow member via an outlet channel which extends from the container fluid outlet up toward the top of the container and back down toward the second orifice of the primary flow member;
    wherein a venturi action flow restriction is disposed in the primary flow member and is adjacent to and upstream of the second orifice of the primary flow member to provide a venturi action to produce a flow from the container through the second orifice to the primary flow member;
    wherein the container includes a check valve disposed at the top; wherein the check valve is closed to block air flow through a vent in the container during filling of the container by the irrigation fluid from the irrigation fluid flow stream via the primary flow line, the first orifice, an inlet channel and the container fluid inlet; and wherein the check valve is open to permit air flow through the vent into the container during draining of the fluid from the container into the irrigation fluid flow stream via the container fluid outlet, the outlet channel, the second orifice, and the primary flow line.

2. The dispensing apparatus of claim 1 wherein the check valve comprises a valve seat disposed adjacent the vent, a check ball retainer disposed below the valve seat, and a check ball disposed between the valve seat and the check ball retainer, the check ball being movable between an open position resting on the check ball retainer to permit air flow through the vent into the container and a closed position being pushed against the valve seat to block air flow through the vent.

3. The fluid dispensing apparatus of claim 1 wherein the container includes a removable container cap.

4. The fluid dispensing apparatus of claim 3 wherein the removable container cap is threadingly coupled to the top of the container.

5. The fluid dispensing apparatus of claim 3 further comprising a seal between the removable container cap and the top of the container.

6. The fluid dispensing apparatus of claim 5 wherein the seal comprises an O-ring.

7. The fluid dispensing apparatus of claim 1 wherein the fluid inlet of the container fluidicly coupled with the first orifice of the primary flow member has a fixed size for a flow passing therethrough and the fluid outlet of the container fluidicly coupled with the second orifice of the primary flow member has a fixed size for a flow passing therethrough.

8. A fluid dispensing apparatus, comprising:
    a primary flow member having a primary flow line disposed between an inlet port and an outlet port, the primary flow line configured to be placed in fluid communication with an irrigation fluid flow stream, the primary flow member including a first orifice disposed near the inlet port and a second orifice disposed near the outlet port, the first and second orifices in fluid communication with the primary flow line; and
    a container having a container fluid inlet and a container fluid outlet, the container fluid inlet being fluidicly coupled with the first orifice of the primary flow member, the container fluid outlet being fluidicly coupled with the second orifice of the primary flow member, the container including a check valve disposed at a top above the container fluid inlet and the container fluid outlet;

wherein the check valve is closed to block air flow through a vent in the container during filling of the container by the irrigation fluid from the irrigation fluid flow stream via the primary flow line, the first orifice, and the container fluid inlet; and wherein the check valve is open to permit air flow through the vent into the container during draining of the fluid from the container into the irrigation fluid flow stream via the container fluid outlet, the second orifice, and the primary flow line.

9. The dispensing apparatus of claim 8 wherein the check valve comprises a valve seat disposed adjacent the vent, a check ball retainer disposed below the valve seat, and a check ball disposed between the valve seat and the check ball retainer, the check ball being movable between an open position resting on the check ball retainer to permit air flow through the vent into the container and a closed position being pushed against the valve seat to block air flow through the vent.

10. The dispensing apparatus of claim 8 wherein the container fluid inlet is disposed near the top of the container, and wherein the container fluid outlet is disposed near a bottom of the container and is fluidicly coupled with the second orifice of the primary flow member via an outlet channel which extends from the container fluid outlet up toward the top of the container and back down toward the second orifice of the primary flow member.

11. A fluid dispensing apparatus, comprising:
a primary flow member having a primary flow line disposed between an inlet port and an outlet port, the primary flow line configured to be placed in fluid communication with an irrigation fluid flow stream, the primary flow member including a first orifice disposed near the inlet port and a second orifice disposed near the outlet port, the first and second orifices in fluid communication with the primary flow line; and
a container having a container fluid inlet and a container fluid outlet, the container fluid inlet being disposed near a top of the container and being fluidicly coupled with the first orifice of the primary flow member, the container fluid outlet being disposed near a bottom of the container and being fluidicly coupled with the second orifice of the primary flow member via an outlet channel which extends from the container fluid outlet up toward the top of the container and back down toward the second orifice of the primary flow member;
wherein the container includes a check valve disposed at the top; wherein the check valve is closed to block air flow through a vent in the container during filling of the container by the irrigation fluid from the irrigation fluid flow stream via the primary flow line, the first orifice, an inlet channel and the container fluid inlet; and wherein the check valve is open to permit air flow through the vent into the container during draining of the fluid from the container into the irrigation fluid flow stream via the container fluid outlet, the outlet channel, the second orifice, and the primary flow line.

12. The dispensing apparatus of claim 11 wherein the check valve comprises a valve seat disposed adjacent the vent, a check ball retainer disposed below the valve seat, and a check ball disposed between the valve seat and the check ball retainer, the check ball being movable between an open position resting on the check ball retainer to permit air flow through the vent into the container and a closed position being pushed against the valve seat to block air flow through the vent.

13. A method of dispensing fluid from a container, the method comprising:
flowing a fluid through a primary fluid flow tube to form a primary fluid flow stream;
diverting a portion of the fluid from the primary fluid flow stream through a first orifice of the primary fluid flow tube into the container via a container fluid inlet of the container to fill the container with the fluid and dilute a product in the container with the fluid;
returning the fluid from the container through a container fluid outlet of the container to the primary fluid flow stream via a second orifice of the primary fluid flow tube;
stopping diverting the fluid into the container; and
siphoning the fluid in the container through the container fluid outlet of the container into the primary fluid flow tube via the second orifice by restricting a flow in the primary fluid flow at a location adjacent to and upstream of the second orifice to produce a venturi action;
wherein siphoning the fluid in the container comprises permitting air flow into the container when stopping diverting the fluid into the container.

14. The method of claim 13 wherein the air flow into the container is controlled by a check valve disposed above the container fluid inlet and the container fluid outlet; wherein the check valve is closed to block air flow through a vent in the container during filling of the container by the fluid from the primary fluid flow stream; and wherein the check valve is open to permit air flow through the vent into the container and siphon the fluid in the container through the container fluid outlet of the container into the primary fluid flow tube via the second orifice when stopping diverting the fluid into the container.

15. The method of claim 14 wherein the check valve comprises a valve seat disposed adjacent the vent, a check ball retainer disposed below the valve seat, and a check ball disposed between the valve seat and the check ball retainer, the check ball being movable between an open position resting on the check ball retainer to permit air flow through the vent into the container and a closed position being pushed against the valve seat to block air flow through the vent.

16. The method of claim 13 wherein stopping diverting the fluid into the container comprises reducing or terminating the fluid flow through the primary fluid flow tube.

17. The method of claim 13 wherein the container fluid inlet is disposed near the top of the container, and wherein the container fluid outlet is disposed near a bottom of the container and is fluidicly coupled with the second orifice of the primary flow member via an outlet channel which extends from the container fluid outlet up toward the top of the container and back down toward the second orifice of the primary flow member.

18. The method of claim 13 further comprising placing inside the container the product to be diluted by the fluid.

19. The method of claim 18 wherein the container has a removable container cap which is removed to place the product inside the container.

20. The method of claim 18 wherein the product is introduced into the container manually.

21. A method of dispensing fluid from a container, the method comprising:
flowing a fluid through a primary fluid flow tube to form a primary fluid flow stream;
diverting a portion of the fluid from the primary fluid flow stream through a first orifice of the primary fluid flow tube into the container via a container fluid inlet of the container to fill the container with the fluid and dilute a product in the container with the fluid;

returning the fluid from the container through a container fluid outlet of the container to the primary fluid flow stream via a second orifice of the primary fluid flow tube;

stopping diverting the fluid into the container; and siphoning the fluid in the container through the container fluid outlet of the container into the primary fluid flow tube via the second orifice;

wherein siphoning the fluid in the container comprises permitting air flow into the container when stopping diverting the fluid into the container.

22. The method of claim 21 wherein the air flow into the container is controlled by a check valve disposed above the container fluid inlet and the container fluid outlet; wherein the check valve is closed to block air flow through a vent in the container during filling of the container by the fluid from the primary fluid flow stream; and wherein the check valve is open to permit air flow through the vent into the container and siphon the fluid in the container through the container fluid outlet of the container into the primary fluid flow tube via the second orifice when stopping diverting the fluid into the container.

23. The method of claim 22 wherein the check valve comprises a valve seat disposed adjacent the vent, a check ball retainer disposed below the valve seat, and a check ball disposed between the valve seat and the check ball retainer, the check ball being movable between an open position resting on the check ball retainer to permit air flow through the vent into the container and a closed position being pushed against the valve seat to block air flow through the vent.

* * * * *

UNITED STATES PATENT AND TRADEMARK OFFICE
CERTIFICATE OF CORRECTION

PATENT NO. : 6,722,527 B1
DATED : April 20, 2004
INVENTOR(S) : Larry Krauss

It is certified that error appears in the above-identified patent and that said Letters Patent is hereby corrected as shown below:

<u>Title page,</u>
Item [73], Assignees, should read -- Automatic Bar Controls, Inc., Vacaville, CA; and Larry Krauss, Vacaville, CA --

Signed and Sealed this

Thirteenth Day of July, 2004

JON W. DUDAS
*Acting Director of the United States Patent and Trademark Office*